3 Sheets—Sheet 1.

A. W. & C. T. KENDRICK.
GRAIN AND SEED SEPARATORS.

No. 186,578.　　　　　Patented Jan. 23, 1877.

Witnesses:
Theodore Munger
D. D. Kane

Inventors:
Andrew W. Kendrick
Charles T. Kendrick

3 Sheets—Sheet 2.
A. W. & C. T. KENDRICK.
GRAIN AND SEED SEPARATORS.
No. 186,578. Patented Jan. 23, 1877.
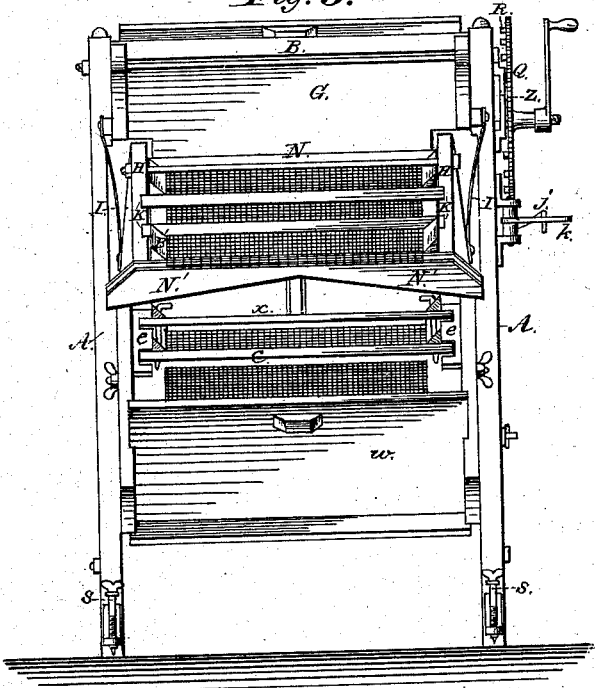
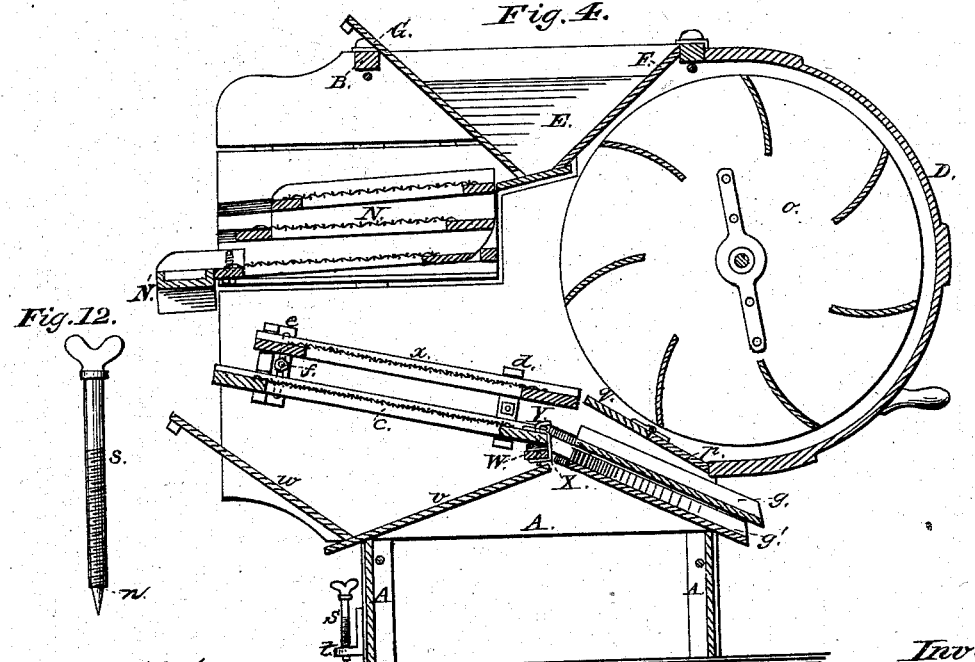
Witnesses:
Theodore Mungen
D. D. Kane
Inventors
Andrew W. Kendrick
Charles T. Kendrick 3 Sheets—Sheet 3.
A. W. & C. T. KENDRICK.
GRAIN AND SEED SEPARATORS.
No. 186,578. Patented Jan. 23, 1877.
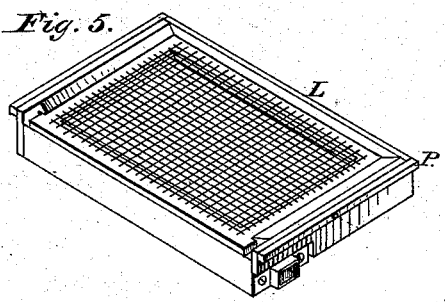
Fig. 5.
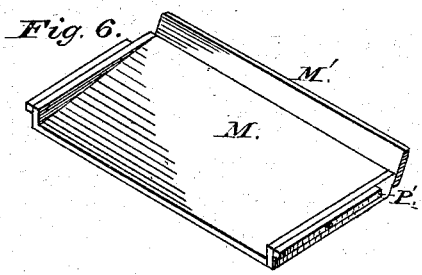
Fig. 6.
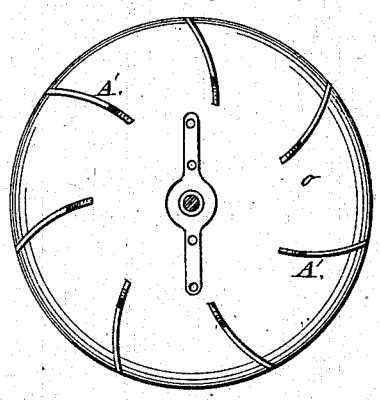
Fig. 7.
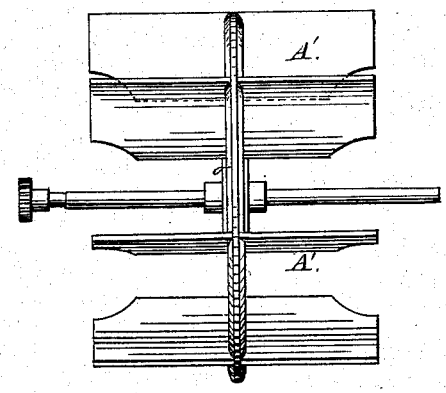
Fig. 7ª.
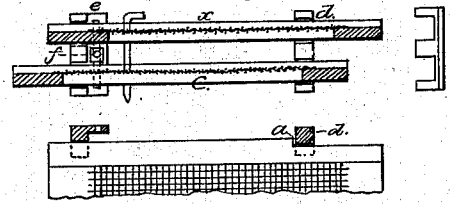
Fig. 8.
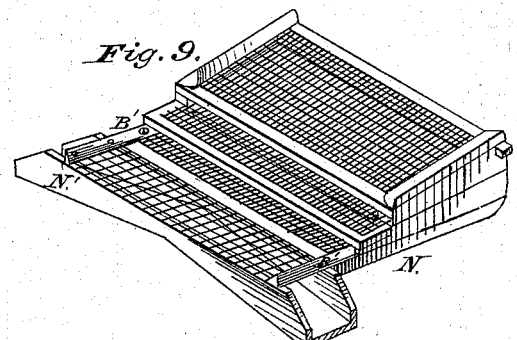
Fig. 9.
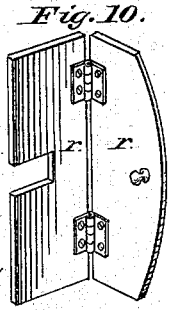
Fig. 10.
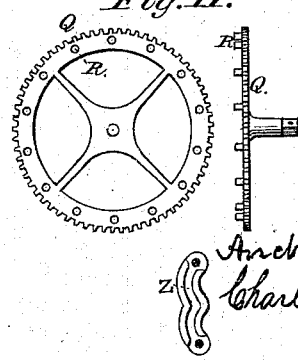
Fig. 11.
Witnesses:
Theodore Mungen,
D. D. Kane
Inventors:
Andrew W. Kendrick
Charles T. Kendrick

UNITED STATES PATENT OFFICE.

ANDREW W. KENDRICK AND CHARLES T. KENDRICK, OF BROOKLYN, N. Y.

IMPROVEMENT IN GRAIN AND SEED SEPARATORS.

Specification forming part of Letters Patent No. 186,578, dated January 23, 1877; application filed January 9, 1877.

*To all whom it may concern:*

Be it known that we, ANDREW W. KENDRICK and CHARLES T. KENDRICK, of the city of Brooklyn and county of Kings, in the State of New York, have invented certain new and useful Improvements in Fanning-Mills and Grain and Seed Separators; and we do hereby declare the following to be a full, clear, and exact description of the same, reference being had to the accompanying drawings, making part of this specification, in which—

Figure 1:
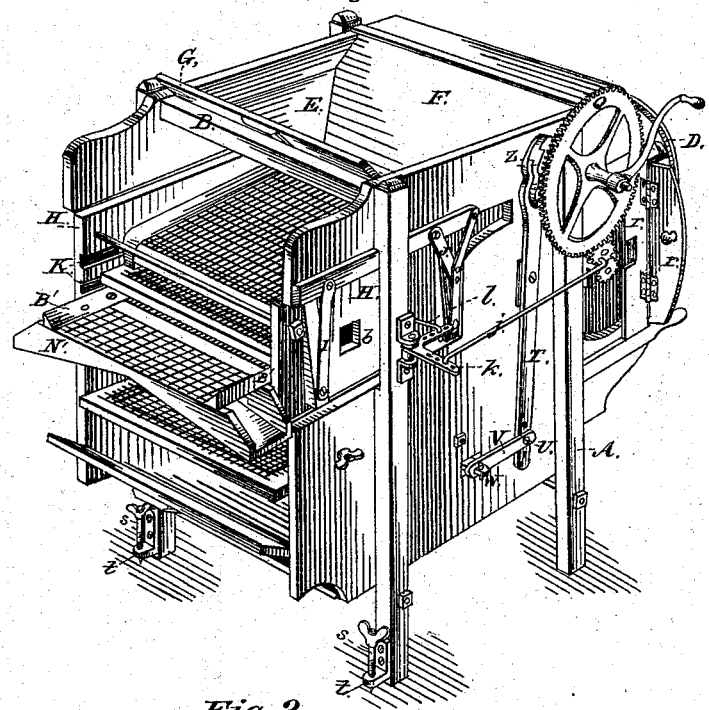
Figure 2:
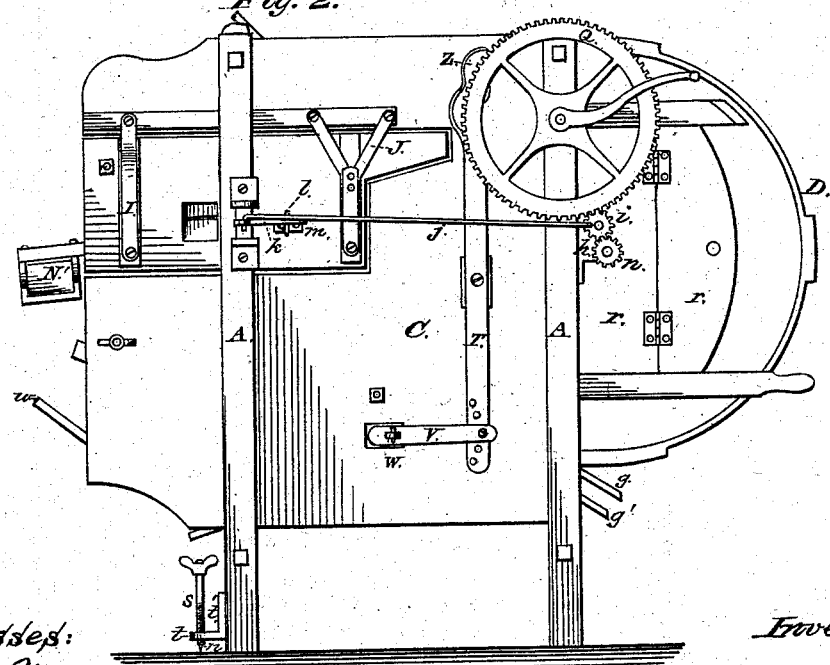

Figure 1 is a perspective view of a machine embodying our invention. Fig. 2 is a side elevation of the same. Fig. 3 is an end elevation of the same. Fig. 4 is a longitudinal vertical section. Fig. 5 is a detail perspective view of our screening-box. Fig. 6 is a detail perspective view of our chess-board. Figs. 7 and 7ª are detail views of our circular partition and fan-wings. Fig. 8 is a detail view, showing the screens, the grooves in which they slide, and the supporting detents or stops against which they strike. Fig. 9 is a detail view of our nest of screens and detachable spout. Fig. 10 is a detail view of the fan-doors. Fig. 11 are details of the driving-wheel and the cam upon the lever. Fig. 12 is an enlarged view of our supporting, steadying, and leveling screw.

Our invention consists—

First, in the combination, with the crank or driving wheel, which is provided with a series of pins or projections upon its rim, of a lever connected to the lower screens of the separator, and having at its upper end a cam-track or other irregular guide, in which said pins or projections play in the rotation of said wheel for vibrating said lever, and thereby communicating rapid reciprocating motion to the said screens.

Second, in providing means for adjusting the cam lever, and thereby regulating the throw or length of reciprocation of said screens.

Third, in a hanger, made of sheet or strap metal, in three pieces, connected together rigidly in the shape of a Y, the upper ends of the Y being secured to the frame or casing of the mill and the lower end of the shoe, for effectually preventing an endwise movement of the shoe during the action of the machine, or in taking out or inserting the screens, grain-boards, &c., while allowing perfect freedom of lateral movement.

Fourth, in the construction of an adjustable and removable supporting-block for the screens.

Fifth, in an improved mode and means of detachably connecting the lower screens to the horizontally-vibrating actuating-lever whereby is secured a truer and steadier motion, and the strain and the wear on the parts relieved.

Sixth, in combination with the projecting screen-supporting blocks on the inside of the mill, of adjustably-inclined screens or sieves, the frames of which have an offset cut or otherwise formed in them at each side, forming a shoulder, which, at the end of each reciprocation, strikes against the said supporting-blocks to produce a jar for facilitating the travel of the material over the screens, and keeping the meshes clear of obstructions.

Seventh, in combination with the projecting supporting-blocks, and screens having the frames formed with offsets, of the pivotal connection with horizontal actuating-lever, consisting of the bolt and clevis, overlapping the screen-frame, and holding it down upon the lever, so as to confine it from jumping, and secure the steady movement of the screens.

Eighth, in a combined chess-board and screening-box, pivoted at its sides to cleats, which slide in the grooves inside the shoe in such a manner as to permit its being adjusted longitudinally in the shoe, or adjusted as to inclination, to regulate the flow of grain over the sieve or board, and to permit its being turned entirely over on its pivotal bearings in the shoe, so as to bring either the screen or the chess-board uppermost, as may be desired, said screening-box being provided with grooves for the admission of one or more screens, as may be preferred, and with one or more discharge-spouts, according to the number of screens.

Ninth, in a chess-board and deflector for the blast, provided at its upper edge with an inclined guard or flange, and on each side pivoted to cleats sliding in grooves in the shoe, to render it capable of adjustment longitudinally in the shoe, and, as to inclination, to accelerate or retard the flow of grain or seed over its surface at will, and to contract, at will, the orifice at the rear of the shoe, and deflect and concentrate the blast to suit the work being done.

Tenth, in a novel construction of the fan-doors or valves which control the entrance of air into the fan-case, each of the doors being composed of two sections hinged together, one section being slightly longer than the other, and sliding between two grooved or beveled bars of the casing, and the other section, hinged to and supported by the sliding section, being made short enough to open between the bars. By this construction the use of two separate slides for the large opening is avoided, while the door or valve, when pulled out to leave the opening entirely free, does not project beyond the outline of the fan case or mill, and is not in the way, as a single large slide would be.

Eleventh, in a circular partition-disk, mounted on the fan-shaft in the middle of the drum, and of a form to fit as closely within said drum as consistent with its free rotation, and so form a practically-tight partition in the drum to prevent the two currents of air rushing in at the opposite ends of the drum from joining and forming a stronger current or blast in the middle of the mill than at the sides.

Twelfth, in the combination of the partition-disk with fan-blades of a concavo-convex form in their cross or vertical section, for increasing the force of the blast, and tending to distribute it more evenly, said fan-blades being mounted and wholly supported upon said central partition-disk, and thus leaving the space near the open ends of the drums unobstructed for the ingress of air.

Thirteenth, in the combination, with our adjustable nest of screens, of a discharge-spout, doubly inclined in either direction toward the sides of the mill, for equalizing the weight of the nest, and provided with a coarse wire-netting cover, which intercepts, and delivers over the tail of the mill, all foreign matters of larger size than the grain; said spout being detachably secured to said nest of screens by two arms, which connect it to either side of said nest; said arms being secured above said netting, and serving, when the trough is in position, both as a means of connection to said nest, and as guards or fenders to prevent any large foreign matters from falling laterally and being remixed with the grain.

Fourteenth, in the attachment to the legs of the mill of adjustable supporting, steadying, and leveling pins or screws, which are provided with thumb-pieces or other suitable handling devices, and a sharp point at the lower end, just above which is formed an annular offset or shoulder, which prevents the pin from penetrating the floor or ground beyond a certain depth, while allowing its rotation, and secures the accuracy of the screw or pin as a leveling device, capable of the nicest adjustment.

In our drawings, A represents the upright frame of our mill; B, the cross-pieces; C, the sides; D, the drum or fan-case. Secured to the sides of the mill are beveled triangular pieces E, forming part of the hopper. On the inside of the mill are grooves for the reception of the stationary side F and sliding side G of the hopper. The latter, being used to regulate the flow of grain, comes close to the upper or feed part of the shoe H, and prevents the grain from escaping when the machine is not in operation. These two sides of the hopper do not come quite together at the bottom, and permit the grain in the bottom of the hopper to rest on the board O, thus insuring its regular feed by the shaking motion of the shoe. H is a swinging shoe, hung at its rear end back of uprights A, by ordinary straps 1. At its front or feed end it is supported by Y-shaped sheet-metal straps J, constructed as follows: Three short pieces of strap metal, of suitable width, are rigidly connected together, by two or more rivets, at the junction of the three members of the Y. The upper ends of the Y are screwed, nailed, or otherwise rigidly fastened to the fan-case, and the lower end to the shoe. When the shoe is hung at each side in this manner, it is prevented from any endwise movement in working, or removing, or inserting screens. Its advantage over the simple crossed straps lies in the metal saved, and the lessening of the weight of the machine by that quantity; while in a mill of this construction, where the casing is cut away opposite the shoe, the crossed metal straps would interfere with the posts. The triple thickness of metal and the rivets, moreover, make a strong connection just at the point of strain, and if wire or rods were used, it would be necessary to have pivot-connections (such as eyes, staples, &c.) both to shoe and casing, increasing cost, and, moreover, losing the elasticity of the metal straps, which is of advantage in easing the motion of the shoe.

The insides of the shoe are formed with grooves K, for holding screens, riddles, adjustable screening-box L, adjustable chess-board M, or nest of screens N, when they are in use. At the upper end of the shoe is a board, O, forming part of the hopper, as it were, the grain in the bottom of the hopper resting upon it. The adjustable screening-box L is shown in Fig. 5; it has cleats P pivoted at its sides, which cleats slide in the grooves of the shoe H. Near the top of the box is one or more sets of grooves for the admission of different screens, and also a chess-board, when desired. Below the screen or screens of box L is a sloping bottom for running the refuse or seeds, as it may be, to the corner of the box, where there is an opening, in which a spout is detachably secured, to convey the seeds or refuse through an opening, $b$, in the shoe, which opening may be made large enough to allow the vertical motion of said spout in adjusting the slope or inclination of the screening-box. The screening-box is smooth and even on the bottom, which may, by the adjustment of the box, be made to serve as a deflector for the blast; or the screening-box may be tilted clear over on its pivots, bringing the bottom uppermost, to serve as a grain or chess board. The adjustable chess-board M is made (see Fig. 6) like the box L, with pivoted cleats P' at the side. At its rear or inner edge is attached or formed a guard or fender, M', standing at an angle (it may be a right angle) to the plane of the chess-board. This fender is intended to counteract the tendency of the grain to fall inward toward the center of the mill and bring it to a point in the rear where it has but a short distance to fall, and where the blast may act upon it upwardly and outwardly; thus blowing the light impurities (dust, foul seeds, &c.) clear over the outer ends of the lower screens. The flange, moreover, aids in concentrating, by narrowing, the channel of the blast. The double adjustability of this chess-board renders it capable of the nicest and most practical adjustment to the condition of the grain, &c.

On the opposite side of the mill from where the power is usually applied we place a driving-wheel, Q, so that the operator is brought into a position for readily and conveniently observing the workings of the mill, and regulating the feed, blast, and shake to suit the work being done.

On one side of the driving-wheel Q is formed or secured a series of pins, R—preferably on the inner side—which engage in and pass through a cam-groove or track, Z, of several curves, (or any other equivalent form of irregular curved guide,) of the form shown in Fig. 11, which cam Z is formed on a metal plate rigidly attached to the upright lever T, pivoted to the side of the mill at any convenient point, usually about one-third of the distance from the top, with the middle point of the cam-track about the same height as the center of the driving-wheel. The length and curvature of the cam-track with relation to the pins is such that one pin has entered the track before its predecessor leaves it, thus securing it from disengagement, and producing an easy and continuous motion. The length of the vibrations of the lever T is governed by the length of the curves in the cam-track.

Near the lower end of lever T is a series of adjustment-holes in an arc of a circle, for the admission of a pin, U, on the link or lever V, permitting the throw of the lower limb of lever T to be adjusted for changing the degree of motion of screens c and x. Of course, an arc-shaped slot and a thumb-screw, or any other adjusting devices for changing the length of lower arm of lever T, would answer equally well.

The connection of cross lever or link V is pivotally attached to a horizontally-vibrating lever, W, pivoted on the opposite inner side of the mill. About halfway across the mill is a clevis, X, made in U shape, of a size to embrace with its arms, above and below, the horizontal lever W, to the lower side of which it is rigidly attached, and the rear bar of screen-frame c. Both arms of the clevis, as well as the screen-frames and clevis, are perforated for the admission of a removable bolt, Y, forming a firm pivotal connection between the lever and the screen-frames, and preventing the movement from being vitiated by the jumping of the screen-frames, which is essential in connection with features hereinafter described, and also preventing the wearing loose of the parts.

The screen c is made in the usual form, except that the frame at each side is cut away at the lower end for a short distance, forming a shoulder, as shown at a.

Attached to and projecting from each side of the casing of the mill is a block or detent, d, against which the screen-frame strikes in its forward movement, producing a sudden stoppage and jar, which, as the screen is firmly held by the clevis and key, is communicated to the screen and material on it, and is calculated to clean the meshes and facilitate thorough sifting.

The blocks or detents have grooves in them, and serve to support the lower end of the screens. The upper outer ends of these screens are supported by grooved blocks e of metal or wood, attached to and partly let into the sides of the mill. They are thinned at one side, where they are provided with longitudinal slots, through which bolts, passing through the sides of the mill, pass and support them, said bolts being provided outside with a thumb-nut, f, so that the blocks can be adjusted. The back parts of said blocks are roughened to prevent slipping out of place. On the upper part of screen c is detachably secured another screen, x, for grading the grain. It should be slightly coarser than screen c, and of the same length, and arranged to reach farther down than screen e.

A portion of the lightest, smallest grains will be moved out of their course in falling, and drop down on the lower screen c, thus partly grading the grain by the blast, and the difference in size of mesh of the two parallel screens will finish the grading. When but one grade is desired, screen x is taken out, and also the upper grain-board g, thus permitting all the screened grain to fall on the lower grain-board g', and pass off at one side of the mill; or, if a coarser screen is required, we remove screen c and put another suitable screen in its place.

At the lower ends of the screens are two lower grain-boards, g and g', one above the other, the lower extending backward to catch the second grade falling from the lower screen, and the upper one to catch the grain falling from the upper screen. On top of these grain-boards, and extending diagonally across, are upright boards, which cause the grain to be carried on one board to one side of the mill, and on the other to the other side, thus separating the grades.

To one of the upright posts a bracket, $h$, is attached, supporting a pinion, $i$, geared to work in the driving-wheel Q, and having connected with it a pitman-rod, $j$, the other end of which connects with an elbow-lever, $k$, connected, by short links $l$, to shoe H by an eye, $m$. Instead of the ordinary link and elbow-lever connections for the shoe, we may connect it, by a rod or other suitable means, to the cam-lever T for vibrating it longitudinally or laterally, as may be desired. Meshing with pinion $i$ is another pinion, $n$, rigidly secured to the fan-shaft for rotating it. Keyed on the fan-shaft is a circular partition-disk, $o$, extending from the shaft as nearly to the inner surface of the drum as it can, to rotate freely within it; and thus forming a practically tight partition, to prevent the two currents from uniting and forming a stronger blast in the middle than at the sides.

To further the equal distribution of the blast thus divided, and increase its force, we make the fan-wings curved in cross-section, and secure them in curved recesses cut in the partition-disk, as shown in Figs. 7 and 7$^a$. The convex sides of the blades strike the divided currents, and, as said blades fit closely in the case, produce temporary compression of the air between the blades and the case, which, by the well-known law of fluids, communicates laterally along the blades or wings, equalizing the blast at each side of the partition-disk; and as the blades, by their shape, strike the air obliquely, a given force of blast is produced and properly directed with less expense of motive power than would be the case with flat blades. At the lower side of the drum, at its curved continuation $p$, is hinged an adjustable wind-deflecting board, $q$. The sides of the mill are provided with wind-doors $r$, each made in two parts of unequal length, hinged together, the longer part sliding in beveled guides and carrying the shorter. This construction permits the accurate adjustment of the air entering; and the whole large opening can be left free by turning back the hinged section and sliding back the supporting one without the door projecting beyond the outline of the drum, and being in the way, as a single large slide would, and is more quickly and conveniently set than two independent valves would be.

On two or more of the upright posts are two or more adjustable steadying and leveling screws, $s$, moving vertically in internal screw-supports formed on brackets $t$, attached to the sides or corners of the base of the uprights. They are provided, as shown in Fig. 12, with thumb-pieces, handles, or other means for turning and adjusting them. If the points were simply tapering ends of the screws they would work into the ground or floor, and preclude the accurate leveling of the mill. To obviate this difficulty, we form the points as inverted cones of a diameter at the base of the cone much less than that of the screw proper; and thus an annular shoulder, $n$, is formed which limits the penetration of the point in the ground or floor, while the circular shape in section of the point permits the free rotation of the screw in the bracket-bearing $t$.

A board, $v$, is placed in the mill, so that its upper edge meets the lower grain-board immediately under the cross piece, forming the lower end of the screen-frame $c$. This catches the screenings falling through the lower screen. The other end extends downward and backward, meeting the wide tail-board $w$ at nearly right angles, thus forming a capacious chess-box.

Our nest of screens N has a detachably attached spout, N', sloping each way from the middle, so as to preserve the equilibrium of the shoe. This spout is covered with coarse wire cloth, permitting the grain to pass through into the spout, and the coarse refuse to pass over the spout and fall at the rear of the mill. The easy motion of the shoe, steadied by the Y-formed spring-strips, is adapted for the removal of oats, sticks, chaff, and all other light foreign matters.

We can use a long meshed wire cloth for our lower screens, as our devices for actuating and steadying them give a short, sharp, firm jarring motion, eminently fitted for screening and separating all particles of the same specific gravity, but of different diameters, whereas, without this rapid vibratory and jarring motion, the meshes soon fill up and become useless.

Our mill may be made to ship in a "knock-down" state, and then put together with rods or nails.

The operation of our invention is as follows: The grain is put into the hopper, which spreads it out upon the top of the shoe. The sliding board G being adjusted and power applied, the grain is delivered, in a wide, thin, even sheet, on the screens in the screening-box L, where most of the cockle, chess, small seeds, sand, dirt, &c., will pass through into the screening-box, and be discharged at the outside of the mill. The grain passes over the screen and falls over its rear end, where it receives a strong blast, taking out the light and most of the remaining impurities. The heaviest grain falls onto screen $x$, and the lighter and smaller onto screen $c$. That falling onto the former will be screened thoroughly, and the small grain, &c., will drop through onto screen $c$, while the large, clean, heavy grain will fall on grain-board $g$, and pass out at the front of the mill into receptacles placed to receive it. The grain falling on screen $c$, as also that escaping through screen $x$, is thoroughly sifted, the impurities dropping into the chess-box, the second grade of grain passing over screen $c$ onto the lower grain-board, and out at the side of the mill opposite to the best grain.

For some kinds of work our chess-board, adjustable like the screening-box, may be substituted for it.

For cleaning grain of oats, a nest of screens, made as shown in Fig. 9, is substituted for the screening-box.

To clean seeds, the nest or screening-box is removed, and suitable screens inserted; and, also, in place of the lower wheat-screens.

Any one, however, familiar with such machines will readily understand the different arrangements and adaptations of the various parts as needed for different purposes.

Having thus described the nature, construction, and operation of our invention, what we claim therein as new and useful, and desire to secure by Letters Patent, is—

1. The wheel Q and pins R, in combination with the cam-guide Z and lever T, when constructed and applied as shown, for giving motion to the screens of grain and seed separators, in the manner substantially as herein set forth and described.

2. The combination of the wheel Q, provided with projections R, the lever provided at one end with the cam-track Z, and having the length of its lower limb adjustable, and the screens $c$ and $x$, substantially as and for the purpose set forth.

3. The flexible hanger made of three pieces of strap or sheet metal connected rigidly together in Y form, and having the upper end of the Y rigidly secured to the casing of the mill and the lower end to the shoe, substantially as and for the purpose set forth.

4. The adjustable and removable supporting-block $e$, formed with grooves to receive and support the screens, and a slotted extension for the reception of a fastening-bolt provided with a thumb-nut, substantially as set forth.

5. The combination, with the screen-frames, of the horizontally-vibrating lever W, having the U-formed clevis X rigidly attached to its under side, and having its upper part fitting over the screen-frame to confine it from vertical motion, the parts being pivotally connected by bolt Y, substantially as set forth.

6. The combination, with the projecting screen-supports $d$, of an adjustable inclined screen or screens, $c$ and $x$, having an offset or shoulder at each side adapted to strike said blocks in the motion of the screens, substantially as set forth.

7. The combination of the projecting screen-supports $d$, the screen or screens having the shoulders or offsets at the sides, the horizontally-vibrating lever W, provided with the rigid clevis, and the pivot-bolt, substantially as and for the purpose set forth.

8. The adjustable and reversible screening-box L, provided with the pivoted cleats P at its sides, and a smooth imperforate bottom adapted for use as a chess-board, substantially as set forth.

9. The adjustable chess-board and deflector M, provided with guard or fender M' and pivoted cleats P', substantially as and for the purpose set forth.

10. The fan-doors or valves $r$, constructed in sections hinged together, one section being supported upon the other, and adapted to open laterally, substantially as and for the purpose set forth.

11. The partition-disk $o$ of the fan, arranged to fit accurately within the drum and divide it into two air-compartments, while allowing the free rotation of the fan, substantially as set forth.

12. The combination, with the partition-disk $o$, slotted to receive and carry the fan-wings, of the fan-wings A', convex in cross-section in the direction of rotation, substantially as set forth.

13. The detachable doubly-inclined spout N', covered with coarse-wire net-work, and provided with arms B', secured to the spout above the net-work, and serving both as a means of attachment to the nest of screens and as fenders for guiding off the coarse impurities, substantially as and for the purpose set forth.

14. The adjustable supporting-screws $s$, for steadying and leveling the mill, formed with a conical point and annular shoulder or offset, substantially as and for the purposes set forth.

ANDREW W. KENDRICK.
CHARLES T. KENDRICK.

Witnesses:
THEODORE MUNGEN,
D. D. KANE.